United States Patent
Takeuchi et al.

[11] Patent Number: 5,343,394
[45] Date of Patent: Aug. 30, 1994

[54] SYSTEM FOR CONTROLLING SAFETY DEVICE FOR VEHICLE

[75] Inventors: Kunihiro Takeuchi; Masami Okano, both of Gumma, Japan

[73] Assignee: Airbag Systems Company Ltd., Gumma, Japan

[21] Appl. No.: 37,446

[22] Filed: Mar. 26, 1993

[30] Foreign Application Priority Data
   Apr. 3, 1992 [JP] Japan ................... 4-110784

[51] Int. Cl.$^5$ ............................. B60R 21/32
[52] U.S. Cl. .................. 364/424.05; 307/10.1; 180/282; 280/735
[58] Field of Search .............. 364/424.05; 307/10.1; 280/735; 180/282

[56]         References Cited
         U.S. PATENT DOCUMENTS

| | | | |
|---|---|---|---|
| 4,346,913 | 8/1982 | Schrauf et al. | 280/735 |
| 4,384,734 | 5/1983 | Yasui | 280/735 |
| 4,695,075 | 9/1987 | Kamiji et al. | 280/735 |
| 4,968,965 | 11/1990 | Naitou et al. | 340/436 |
| 5,083,276 | 1/1992 | Okano et al. | 364/424.05 |
| 5,101,192 | 3/1992 | Ishizuka | 340/436 |
| 5,112,080 | 5/1992 | Okano | 280/735 |
| 5,146,104 | 9/1992 | Schumacher et al. | 307/10.1 |
| 5,283,472 | 2/1994 | Takeuchi et al. | 307/10.1 |

FOREIGN PATENT DOCUMENTS
3-79450 4/1991 Japan.

Primary Examiner—Thomas G. Black
Assistant Examiner—Julie D. Day
Attorney, Agent, or Firm—Fish & Richardson

[57] ABSTRACT

A system for controlling a safety device for a vehicle has a first and a second switching element connected in series in this order from a power source toward the ground. A condenser is interposed between a connecting point for both the first and second switching element and the ground in such a manner as to be in parallel relation to the second switching element. The actuating element for the vehicle safety device is connected in serial relation to the condenser between the connecting point and the ground. The control system further has an electric current supply control device. This electric current supply control device periodically effects ON/OFF control operations over the first and second switching elements. Each cycle for effecting the ON/OFF control operation over the first and second switching elements includes a time period where the first switching element is in the ON-state and the second switching element is in the OFF-state as well as a time period where the first switching element is in the OFF-state and the second switching element is in the ON-state. Owing to this arrangement, alternating current is supplied to a squib to actuate the vehicle safety device.

8 Claims, 1 Drawing Sheet

5,343,394

SYSTEM FOR CONTROLLING SAFETY DEVICE FOR VEHICLE

BACKGROUND OF THE INVENTION

This invention relates to a system for controlling a safety device for a vehicle, such as an air bag.

As discussed in Japanese Unexamined Patent Publication No. 79,450/91, a typical conventional system for controlling an air bag comprises a first and a second transistors (switching means) connected in series between a power source and the ground, and a squib (actuating element) connected in series between the first and second transistors. This control system further comprises an acceleration sensor and a microcomputer. In accordance with an acceleration signal from the acceleration sensor, the microcomputer normally judges whether or not a vehicle collision has occurred. When the judgment result is "YES", the microcomputer outputs trigger signals simultaneously to the first and second transistors from two output ports so that the first and second transistors are turned ON. As a result, a direct electric current is supplied to the squib from the power source to ignite the squib, thereby inflating the air bag.

In the control system thus constructed, two transistors are used, and therefore even if one of the transistors is subjected to an ON failure (i.e., one of the transistors is accidentally turned ON due to failure or malfunction thereof), the air bag can be prevented from being accidentally inflated. However, there still remains a possibility, very small though, that the air bag is accidentally inflated when both of the transistors are simultaneously turned ON by accident either due to failure of the transistors themselves or due to runaway of the microcomputer, or when the squib is short-circuited to a body of the vehicle under the condition that the transistor near the power source is accidentally turned ON due to failure of the transistor itself.

A control system disclosed in U.S. Pat. No. 5,083,276 is similar to that of the above Japanese Publication in the respect that two trigger signals are outputted simultaneously from two output ports when a microcomputer judges that a vehicle collision has occurred. The control system of this U.S. Patent further comprises two analog collision judgment circuits which output trigger signals respectively when the analog collision judgement circuits judge that a vehicle collision has occurred. The transistors are turned ON only when they receive simultaneously trigger signals from the corresponding output ports of the microcomputer and trigger signals from the corresponding analog collision judgment circuits, respectively. Owing to this arrangement, the air bag can be prevented from being accidentally inflated even at the time the microcomputer runs away. However, it is still impossible for this control system to prevent the air bag from being accidentally inflated when both of the transistors are simultaneously turned ON by accident.

SUMMARY OF THE INVENTION

It is therefore an object of the present invention to provide a control system in which a possibility for accidentally inflating a vehicle safety device can be minimized.

According to the present invention, there is provided a system for controlling a safety device for a vehicle, comprising:

(a) first and second switching means connected in series in this order from a power source toward the ground;

(b) a condenser interposed between a connecting point for the first and second switching means and the ground, and arranged in parallel relation to the second switching means, an actuating element of the vehicle safety device being connected in serial relation to the condenser between the connecting point and the ground; and (c) electric current supply control means for periodically effecting ON/OFF control operations over the first and second switching means, each cycle for effecting the ON/OFF control operation over the first and second switching means including a time period where the first switching means is in an ON-state and the second switching means is in an OFF-state as well as a time period where the first switching means is in an OFF-state and the second switching means is in an ON-state, thereby supplying an alternating current to a squib.

DETAILED DESCRIPTION OF THE EMBODIMENTS

Figure 1:
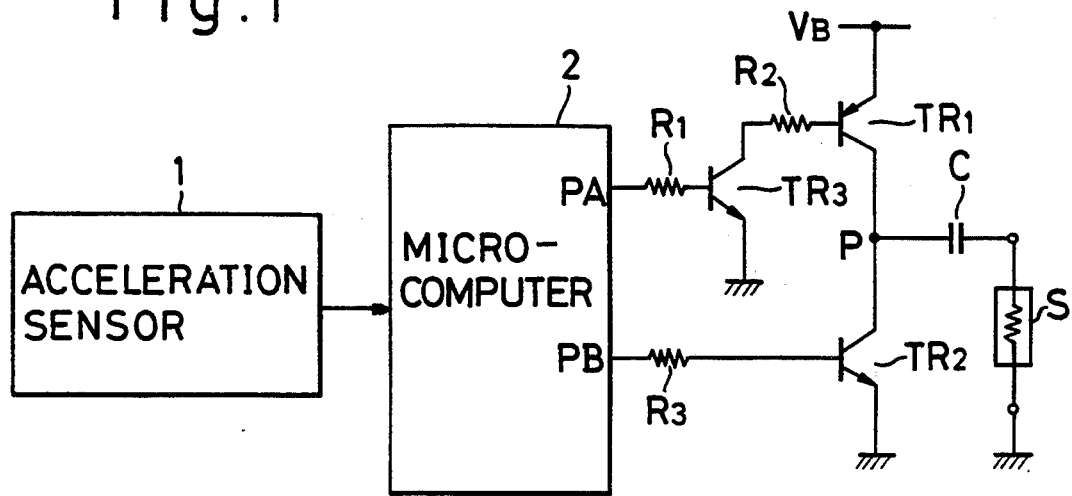
FIG. 1 is a circuit diagram of an air bag control system according to one embodiment of the present invention.

One embodiment of the present invention will be described hereinafter with reference to FIGS. 1 and 2. As shown in FIG. 1, a system for controlling a squib S (actuating device) of an air bag (vehicle safety device) comprises a PNP type first transistor $TR_1$ (first switching means), and an NPN type second transistor $TR_2$ (second switching means) connected in series in this order from a power source $V_B$ toward the ground. Between a connecting point P for both the transistors $TR_1$ and $TR_2$ and the ground, a condenser C and the squib S are connected in series in this order toward the ground. The condenser C and the squib S are in parallel relation to the second transistor $TR_2$.

The control system further comprises an acceleration sensor 1, an analog-to-digital converter (not shown) for digitizing a signal voltage representative of acceleration from the acceleration sensor 1, and a microcomputer 2 (electric current supply control means) for processing such digitized acceleration data. The microcomputer 2 includes two output ports PA and PB.

The output port PA is connected to a base of an NPN type third transistor $TR_3$ through a resistor $R_1$. A collector of this third transistor $TR_3$ is connected to a base of a first transistor $TR_1$ through a resistor $R_2$. Owing to this arrangement, when the level of output of the output port PA is high, the third transistor $TR_3$ is turned ON, and as a result, the first transistor $TR_1$ is turned ON.

The output port PB is connected to a base of the second transistor $TR_2$ through a resistor $R_3$. Owing to this arrangement, when the level of output of the output port PB is high, the second transistor $TR_2$ is turned ON.

With the above construction, the microcomputer 2 judges at intervals of short periods of time whether or not the vehicle collision has occurred. In other words, the acceleration data from the acceleration sensor 1 are periodically inputted into and integrated by the microcomputer 2. When this integral value increases in a deceleration direction and exceeds a threshold value, the microcomputer judges that the vehicle collision has occurred.

When the microcomputer 2 judges that no vehicle collision has occurred, the microcomputer maintain the output ports PA and PB in low levels respectively and keeps the first and second transistors $TR_1$ and $TR_2$ in OFF-states respectively.

Figure 2:
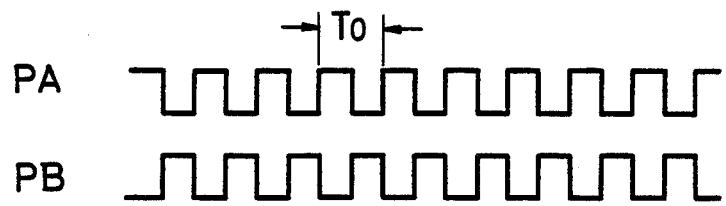
FIG. 2 is a time chart showing the levels of two output ports of the microcomputer.

As shown in FIG. 2, when the microcomputer 2 judges that the vehicle collision has occurred, the microcomputer 2 controls the output port PA such that high and low output levels thereof are repeated at the same cycle of time periods $T_o$ as the output port PB. A phase difference between the output levels of the output ports PA and PB is 180 degrees. In other words, during a first half time period of each cycle of the time period $T_o$, the output port PA is brought to a high level and the output port PB is brought to a low level, whereas during a second half time period, the output port PA is brought to a low level and the output port PB is brought to a high level.

When the output port PA is on the high level and the output port PB is on the low level, the first transistor $TR_1$ is in the ON-state and the second transistor $TR_2$ is in the OFF-state. Therefore, the condenser C is charged with an electric current until a voltage of the condenser C is brought generally to the level of a power source voltage $V_B$. During this charging operation, electric current directing toward the ground from the condenser C flows through the squib S.

When the output port PA is on the low level and the output port PB is on the high level, the first transistor $TR_1$ is in the OFF-state and the second transistor $TR_2$ is in the ON-state. Therefore, the supply of electric current from the power source $V_B$ to the condenser C is cut off, and the electric current in the condenser C is discharged until the voltage of the condenser C is brought generally to the level of the ground voltage. During this discharging operation, electric current directing toward the condenser C from the ground flows through the squib S.

As described above, by means of repetition of the charging and discharging operation with respect to the condenser C, alternating electric current flows through the squib S to ignite the squib S, and as a result, the air bag is inflated.

When both the first and second transistors $TR_1$ and $TR_2$ are subjected to ON failures (namely, accidentally turned ON) when no vehicle collision occurs, a huge amount of electric current from the power source $V_B$ flows toward the ground via the transistors $TR_1$ and $TR_2$, and the connecting point P. As a result, wires connected respectively to the transistors $TR_1$ and $TR_2$ are instantaneously melt down to stop the supply of electric current to the transistors $TR_1$ and $TR_2$ and also to the connecting point P. Since the squib S is cut off its communication with the connecting point P by the condenser C, the huge amount of electric current does not flow into the squib S, and as a result the air bag can be prevented from being accidentally inflated. Even when the transistors $TR_1$ and $TR_2$ are accidentally turned ON because of the output ports PA and PB being maintained respectively on high levels due to runaway of the microcomputer 2, the electric current does not flow into the squib S, and therefore the air bag can be prevented from being accidentally inflated as in the case just mentioned above. In the case where the connecting point P is short-circuited to the vehicle body when the first transistor $TR_1$ is subjected to the ON failure, the air bag can likewise be prevented from being accidentally inflated.

In the case where only the first transistor $TR_1$ is subjected to the ON failure when the second transistor $TR_2$ is in the OFF-state, the condenser C is charged with electric current but only once, and the electric current flows through the squib S during this single charging period of time. In this case, however, since the time for supplying the electric current to the squib S is shorter than the time for supplying the electric current required for igniting the squib S, the air bag is not accidentally inflated.

Figure 3:
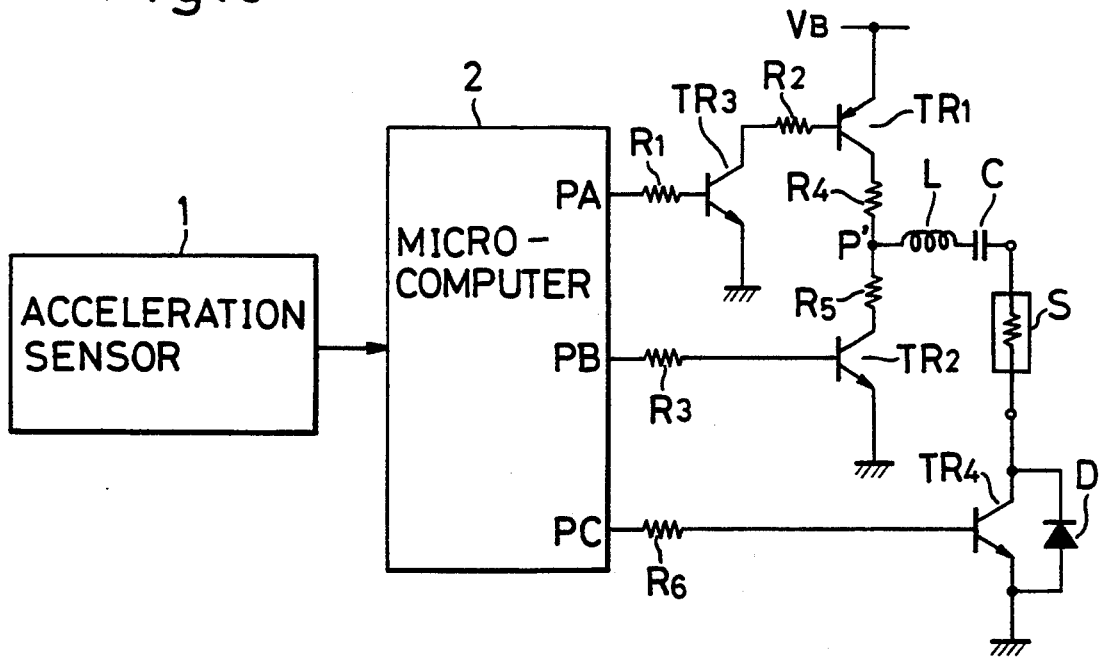
FIG. 3 is a circuit diagram of an air bag control system according to another embodiment of the present invention.

FIG. 3 shows another embodiment of the present invention. In this embodiment, component parts corresponding to those of FIG. 1 are represented by identically reference numerals and description thereof is omitted. In this embodiment, resistors $R_4$ and $R_5$ having equal resistance values are connected in series between the first and second transistors $TR_1$ and $TR_2$. And a coil L, a condenser C, a squib S, and an NPN type fourth transistor $TR_4$ are connected in series in this order from a connecting point P' for both the resistors $R_4$ and $R_5$ toward the ground. The coil L, the condenser C, the squib S, and the fourth transistor $TR_4$ are in parallel relation to the second transistor $TR_2$. A diode D is connected in parallel relation to the fourth transistor $TR_4$. This diode D has an anode facing with the ground. The microcomputer 2 has another output port PC. This output port PC is connected to a base of the fourth transistor $TR_4$ through a resistor $R_6$.

In the embodiment of FIG. 3, when the microcomputer 2 judges that the vehicle collision has occurred, signals of a high level are continuously outputted from the output port PC to turn ON the fourth transistor $TR_4$, and a switching operation of the output levels of the output ports PA and PB shown in FIG. 2 is performed at a resonance frequency f of a serial circuit of a coil L and the condenser C. This resonance frequency f is represented by the following equation.

$$f = \tfrac{1}{2}\pi \sqrt{L \cdot C}$$

As in the embodiment of FIG. 1, alternating current is supplied to the squib S. The flow of electric current from the condenser C toward the ground via the squib S is permitted by the fourth transistor $TR_4$ which is in the ON-state, while the reverse flow of the electric current is permitted by the diode D.

In FIG. 3, since an additional condition for turning ON the fourth transistor $TR_4$ is required for igniting the squib S, the air bag can be more positively prevented from being inflated by accident.

Only when the microcomputer 2 performs the switching operation with respect to the levels of the output ports PA and PB at the resonance frequency f, a sufficient amount of electric current is supplied to the squib S and as a result the air bag can be inflated. When electric current accidentally flows through the squib S because the levels of the output ports PA and PB are switched at random from one to the other due to runaway of the microcomputer 2, the amount of such electric current is extremely small compared with the amount required for the ignition of the squib S. Thus, the air bag can be more positively prevented from being inflated by accident.

In the embodiment shown in FIG. 3, since the resistors $R_4$ and $R_5$ are used, even if the first transistor $TR_1$ is subjected to ON failure, the squib S can be ignited upon collision of the vehicle as long as the second and fourth transistors $TR_2$ and $TR_4$ are in normal conditions. More specifically, when the second transistors $TR_2$ is turned OFF, the condenser C is charged with electric current until the voltage of the condenser C is brought to the level of the voltage of the power source $V_B$. When the second transistor $TR_2$ is turned ON, the voltage of the connecting point P' is brought to ½ of the voltage of the power source voltage $V_B$ due to voltage dividing function of the resistors $R_4$ and $R_5$, and the condenser C is discharged until the voltage of the condenser C is brought to the level of the voltage of the connecting point P'. As a result, although the alternating current supplied to the squib S is reduced to a half of the supply amount of alternating current when the first transistor $TR_1$ is in normal condition, it is still possible to inflate the air bag.

Even when the second transistor $TR_2$ is subjected to ON failure and other transistors $TR_1$, $TR_3$ and $TR_4$ are in normal conditions, the air bag can be inflated in the same manner as mentioned above. In that case, the condenser C is charged with electric current until the voltage of the condenser C is brought to ½ of the power source voltage $V_B$, and then discharged until the voltage of the condenser C is brought generally to the level of the ground voltage.

The present invention is not limited to the above embodiments and various modifications can be made. For example, the time period where the switching means is in the ON-state may be slightly shorter than the half time period of the control cycle. Furthermore, in the case where the resistors $R_4$ and $R_5$ are used as in the case of the embodiment of FIG. 3, the time period where the switching means is kept in the ON-state may be slightly longer than the half time period. Although a phase difference between the ON and OFF control operations over the first and second switching means is preferably 180 degrees, it may be slightly shifted from 180 degrees.

The present invention may be applied not only to the control system for the air bag but also to a control system for a pretensioner of a seat belt.

What is claimed is:

1. A system for controlling a safety device for a vehicle, comprising:
   (a) first and second switching means connected in series in this order from a power source toward the ground;
   (b) a condenser interposed between a connecting point for said first and second switching means and the ground, and arranged in parallel relation to said second switching means, an actuating element of said vehicle safety device being connected in serial relation to said condenser between said connecting point and the ground; and
   (c) electric current supply control means for periodically effecting ON/OFF control operations over said first and second switching means, each cycle for effecting said ON/OFF control operation over said first and second switching means including a time period where said first switching means is in an ON-state and said second switching means is in an OFF-state as well as a time period where said first switching means is in an OFF-state and said second switching means is in an ON-state, thereby supplying an alternating current to the actuating element of said vehicle safety device.

wherein in which a coil is interposed between said connecting point and the ground in such a manner as to be in serial relation to said condenser and said actuating element, said electric current supply control means controlling said first and second switching means at a resonance frequency of said condenser and said actuating element.

2. The control system according to claim 1, in which said electric current supply control means controls said first switching means so as to be brought into the ON-state and said second switching means into the OFF-state during a half time period of said each cycle for effecting said ON/OFF control operation, and said electric current supply control means controls said first switching means so as to be brought into the OFF-state and said second switching means into the ON-state during the remaining half time period.

3. The control system according to claim 1, in which said first and second switching means are normally closed, and said condenser is interposed between said connecting point and said actuating element.

4. The control system according to claim 1, further comprising an acceleration sensor and a microcomputer, said microcomputer including a first and a second output ports for outputting control signals respectively to said first and second switching means, said microcomputer integrating an acceleration data from said acceleration sensor to obtain an integral value, judging whether or not said integral value, which is increasing in a decelerating direction, exceeds a threshold value, and effecting, as said electric current supply control means, said ON and OFF control operations over said first and second switching means when the judgment result is "YES".

5. The control system according to claim 4, in which said first switching means comprises a PNP type first switching transistor, said second switching means comprises an NPN type second transistor, and said control system further comprises an NPN type third transistor, a collector of said third transistor being connected to a base of said first transistor, said first port of said microcomputer being connected to a base of said third transistor, said second port of said microcomputer being connected to a base of said second transistor, said microcomputer bringing said first port into a high level to turn ON said first transistor and said second port into a low level to turn OFF said second transistor during a half time period of said each cycle for effecting said ON/OFF control operation, said microcomputer bringing said first port into a low level to turn OFF said first transistor and said second port into a high level to turn ON said second transistor during the remaining half time period.

6. The control system according to claim 1, in which a first resistor is interposed between said first switching means and said connecting point, and a second resistor is interposed between said second switching means and said connecting point.

7. The control system according to claim 6, in which said first and second resistors have resistance values equal to each other.

8. A system for controlling a safety device for a vehicle, comprising:
- (a) first and second switching means connected in series in this order from a power source toward the ground;
- (b) a condenser interposed between a connecting point for said first and second switching means and the ground, and arranged in parallel relation to said second switching means, an actuating element of said vehicle safety device being connected in serial relation to said condenser between said connecting point and the ground; and
- (c) electric current supply control means for periodically effecting ON/OFF control operations over said first and second switching means, each cycle for effecting said ON/OFF control operation over said first and second switching means including a time period where said first switching means is in an ON-state and said second switching means is in an OFF-state as well as a time period where said first switching means is in an OFF-state and said second switching means is in an ON-state, thereby supplying an alternating current to the actuating element of said vehicle safety device further comprising a transistor interposed between a further connecting point and the ground and connected in serial relation to both the actuating element of said vehicle safety device and said condenser, and a diode with an anode facing with the ground likewise interposed between said further connecting point and the ground and connected in parallel relation to said transistor, said electric current supply control means keeping said transistor in the ON-state when a vehicle collision has occurred.

* * * * *

UNITED STATES PATENT AND TRADEMARK OFFICE
CERTIFICATE OF CORRECTION

PATENT NO. : 5,343,394
DATED : August 30, 1994
INVENTOR(S) : Kunihiro Takeuchi, Masami Okano It is certified that error appears in the above-indentified patent and that said Letters Patent is hereby corrected as shown below:

Column 8, line 6, after "device" insert --,--.

Signed and Sealed this

Twenty-first Day of February, 1995

Attest:

BRUCE LEHMAN

Attesting Officer      Commissioner of Patents and Trademarks